(12) United States Patent
Mayer (10) Patent No.: US 11,977,145 B2
(45) Date of Patent: May 7, 2024

(54) METHOD FOR FMCW-BASED DISTANCE MEASUREMENT

(71) Applicant: Endress+Hauser SE+Co. KG, Maulburg (DE)

(72) Inventor: Winfried Mayer, Buch (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 469 days.

(21) Appl. No.: 17/414,512

(22) PCT Filed: Dec. 17, 2019

(86) PCT No.: PCT/EP2019/085518
§ 371 (c)(1),
(2) Date: Jun. 16, 2021

(87) PCT Pub. No.: WO2020/127177
PCT Pub. Date: Jun. 25, 2020

(65) Prior Publication Data
US 2022/0066013 A1 Mar. 3, 2022

(30) Foreign Application Priority Data
Dec. 18, 2018 (DE) ...................... 10 2018 132 739.0

(51) Int. Cl.
*G01S 13/34* (2006.01)
*G01S 7/35* (2006.01)
(Continued)

(52) U.S. Cl.
CPC ............ *G01S 13/343* (2013.01); *G01S 7/356* (2021.05); *G01S 7/4056* (2013.01); *G01F 23/284* (2013.01); *G01S 7/352* (2013.01)

(58) Field of Classification Search
CPC ...... G01S 13/343; G01S 7/356; G01S 7/4056; G01S 7/352; G01F 23/284
See application file for complete search history.

(56) References Cited

U.S. PATENT DOCUMENTS 10,295,394 B2 * 5/2019 Vogel .................. G01F 23/2962
2007/0040728 A1 * 2/2007 Nishimura ............ G01S 13/426
342/107

(Continued)

FOREIGN PATENT DOCUMENTS

DE 102007008944 A1 9/2007
DE 102009045677 A1 4/2011
(Continued)

*Primary Examiner* — Timothy A Brainard
*Assistant Examiner* — Ismaaeel A. Siddiquee
(74) *Attorney, Agent, or Firm* — Mark A. Logan; Endress+Hauser (USA) Holding, Inc.

(57) ABSTRACT

Disclosed is a method and a corresponding distance-measuring device for measuring a distance to an object using FMCW radar. The method includes the frequency-dependent determination of the amplitude of the radar signal, i.e. the frequency response in the output path and in the input path of the distance-measuring device. The standard windowing of the evaluation signal can be corrected using a correction factor dependent on the frequency responses. Thus the frequency dependence of the radar signal is compensated independently of device-internal or external interferences by adapting the window function. The result is more accurate and reliable distance measurement using FMCW radar. Because the distance can be determined by the disclosed method very accurately and without distortion, it is advantageous to use the distance-measuring device as a fill-level measuring device to measure the fill level of a filling material in a container.

7 Claims, 5 Drawing Sheets

(51) Int. Cl.
*G01S 7/40* (2006.01)
*G01F 23/284* (2006.01)

(56) References Cited

U.S. PATENT DOCUMENTS

| | | | |
|---|---|---|---|
| 2007/0103360 A1 | 5/2007 | Nakanishi | |
| 2015/0116142 A1* | 4/2015 | Jirskog | G01S 13/347 342/124 |
| 2015/0219753 A1* | 8/2015 | Salle | G01S 7/032 342/174 |
| 2016/0202347 A1* | 7/2016 | Malinovskiy | G01S 13/88 342/124 |

FOREIGN PATENT DOCUMENTS

| | | |
|---|---|---|
| DE | 102013108490 A1 | 2/2015 |
| EP | 3418699 A1 | 12/2018 |
| WO | 2012120126 A1 | 9/2012 |
| WO | 2015149850 A1 | 10/2015 |

\* cited by examiner

METHOD FOR FMCW-BASED DISTANCE MEASUREMENT

CROSS-REFERENCE TO RELATED APPLICATIONS

The present application is related to and claims the priority benefit of German Patent Application No. 10 2018 132 739.0, filed on Dec. 18, 2018 and International Patent Application No. PCT/EP2019/085518, filed on Dec. 17, 2019, the entire contents of which are incorporated herein by reference.

TECHNICAL FIELD

The invention relates to a method for the FMCW-based measurement of a distance to an object and to a corresponding distance measuring-device which can be used in particular for measuring fill level.

BACKGROUND

In process automation technology, field devices for capturing or modifying process variables are generally used. For this purpose, the functioning of the field devices is in each case based on suitable measuring principles in order to capture the corresponding process variables, such as fill level, flow rate, pressure, temperature, pH value, redox potential, or conductivity. A wide variety of such field devices is manufactured and distributed by the Endress+Hauser company.

For measuring the fill level of filling materials in containers, radar-based measuring methods have become established since they are robust and require minimum maintenance. Within the scope of the invention, the term "containers" also refers to containers that are not closed, such as basins, lakes, or flowing bodies of water. A key advantage of radar-based measuring methods lies in their ability to measure the fill level quasi-continuously. In the context of this patent application, the term "radar" refers to electromagnetic waves having frequencies between 0.03 GHz and 300 GHz. Typical frequency bands in which fill-level measurement is carried out are 2 GHz, 6 GHz, 26 GHz, or 79 GHz. The higher the frequency band selected, the narrower the beam cone in which the radar signal is emitted.

The FMCW measuring principle ("Frequency Modulated Continuous Wave") has become established as a measuring principle for radar-based distance measurement. The measuring principle is described, for example, in "Radar Level Detection, Peter Devine, 2000". The measuring principle of FMCW is based on emitting radar signals at a modulated frequency. In this case, the frequency of the radar signal lies within a defined frequency band in the range of a standardized center frequency. Characteristic of FMCW is here that the transmission frequency is not constant but changes periodically within the defined frequency band. The change in frequency over time is linear by default for FMCW and has a ramp or triangular shape. However, a sinusoidal change can in principle also be used. At a center frequency of 79 GHz, the frequency band is, for example, 2 GHz, that is, from 78 GHz to 80 GHz.

When implementing the FMCW method, the distance to the filling material or the fill level is determined on the basis of the frequency difference between the currently received signal and the currently emitted radar signal. For this purpose, the currently reflected received signal is mixed down with the transmitted radar signal. The frequency of the resulting evaluation signal reflects the frequency difference between the currently received signal and the currently emitted radar signal.

In addition to freely radiating radar measurement, in which the radar signals are emitted or received via an antenna, the variant of guided radar also exists. In this case, the radar signal is guided via an electrically conductive probe (for example, a coaxial cable or a metal rod) which is lowered into the container. At the location of the filling material surface, the radar signal is reflected in the probe and conducted back along the probe toward the fill-level measurement device. This variant of radar-based fill level measurement is also known by the term TDR (time-domain reflectometry). This variant is advantageous in that due to the guided signal radiation, less power is required for operating the fill level measurement device. Analogously to freely radiating radar devices according to the FMCW principle, an evaluation signal for ascertaining the fill level is also generated when implementing the TDR principle.

In order to determine the frequency of the evaluation signal in FMCW, this method is subjected to a Fourier transform. The resulting evaluation curve reflects the amplitude as a function of the frequency. The fill level is determined from the evaluation curve by detecting and locally assigning the maximum caused by the filling material surface. In the ideal case, there is no further maximum besides the maximum that is generated by the filling material surface.

In addition to the basic maximum, which can be assigned to the filling material surface or to the object, corresponding secondary maxima also arise in the Fourier transform in. To suppress secondary maxima, the evaluation signal is therefore subjected to a windowing before the Fourier transform. The term "windowing" means a weighting of the evaluation signal within the frequency band in which the frequency is changed in the case of the FMCW method. The principle of windowing is described, for example, in "*On the Use of Windows for Harmonic Analysis with the Discrete Fourier Transform*" Proceedings of the IEEE, vol. 66, no. 1, January 1978.

A prerequisite for the undisturbed efficiency of the windowing is that the radar signals are emitted or reflected with the same power independently of frequency. Accordingly, the effectiveness of the windowing is limited by a frequency dependence of the filling material or a frequency dependence of interfering elements. Components internal to devices of the fill-level measuring device can also distort or falsify the evaluation signal, for example if components have a parasitic frequency dependence, or if components degrade as the operating time increases. Thus, capacitance of capacitors may shrink or oscillators may fail. As a result, the measurement accuracy can be reduced overall, or systematic deviations in the distance measurement can be set, which cannot be compensated by the window function.

SUMMARY

The invention is therefore based on the object of providing an error-safe, FMCW-based distance-measuring method.

This object is achieved according to the invention by a method for FMCW radar-based measurement of a distance to an object. The method comprises the following method steps:

Generating an electric radio-frequency signal frequency-modulated according to the FMCW principle, Emitting the radio-frequency signal as radar signal in the direction of the object, Receiving the reflected radar signal as an electrical received signal after reflection on the object, Generating an evaluation signal by mixing the received signal with the radio-frequency signal, Weighting the frequencies of the evaluation signal by means of a defined window function, and Determining the distance based on the weighted evaluation signal.

The method according to the invention is characterized by:

A frequency-dependent determination
of the amplitude of the radio-frequency signal,
of the amplitude of the received signal,
of the amplitude of the evaluation signal, and/or
of the amplitude of the radio-frequency signal in superposition with the received signal, and Correcting the window function based on the frequency-dependent amplitude of the radio-frequency electrical signal, the received signal, the evaluation signal and/or the amplitude of the radio-frequency signal in superposition with the received signal.

In principle, any function can be implemented as a window function. However, it is particularly appropriate to use a Hamming function, a Taylor function or a Chebyshev function.

The method according to the invention thus compensates the frequency dependence of the radar signal independently of device-internal or device-external interfering influences by adjusting the windowing. This results overall in a more accurate and secure FMCW radar-based distance measurement.

According to the invention, the windowing can be corrected on the basis of a correction factor. The correction factor here represents the ratio between the amplitude response of the transmitted radio-frequency signal and the amplitude response of the incoming radio-frequency signal. Accordingly, the window function can be determined, for example, by means of one of the following correction functions:

$$K(f) = \left(1 - \frac{A_{MP2}(f)}{A_{MP1}(f)}\right)^{-1}$$

or $$K(f) = \left(1 - \frac{A_{MP2}(f)}{A_{MP3}(f)}\right)^{-1}$$

or $$K(f) = \left(1 - \frac{A_{MP4}(f)}{A_{MP1}(f)}\right)^{-1}$$

or $$K(f) = \left(1 - \frac{A_{MP4}(f)}{A_{MP3}(f)}\right)^{-1}$$

where $A_{mp,x}(f)$ represents the amplitude response at the respective measurement point x.

The frequency dependence of the amplitude (i.e. the amplitude response) of the received signal, of the radio-frequency signal, of the evaluation signal and/or the frequency dependence of the amplitude of the radio-frequency signal in superposition with the received signal can be measured within the scope of the invention, for example, by generating the radio-frequency electrical signal stepwise within the FMCW frequency band at a respectively constant frequency.

The distance can be determined from the evaluation signal, as is known in FMCW, by means of a Fourier transform, in particular a Fast Fourier transform, of the weighted evaluation signal.

An FMCW radar-based distance-measuring device for measuring a distance to an object that operates in accordance with the method described above has to include components set forth below:

A radio-frequency generating unit configured to generate a radio-frequency electric signal frequency-modulated according to the FMCW principle, A transmitting/receiving antenna which serves for emitting the radio-frequency signal as a radar signal and which serves for receiving the radar signal reflected on the object as an electrical received signal, A mixer by means of which the radio-frequency electrical signal can be mixed with the received signal in such a way that an evaluation signal is generated, A weighting unit designed to weight the evaluation signal with regard to its frequencies by means of a defined window function, and An evaluation unit which is designed to determine distance based on the weighted evaluation signal.

The evaluation unit comprises a measuring unit for implementing the method according to the invention, by means of which the amplitude of the radio-frequency signal,
the amplitude of the received signal,
the amplitude of the evaluation signal, and/or
the amplitude of the radio-frequency signal in superposition with the received signal can be determined as a function of frequency. In addition, the evaluation unit is designed to implement the method in such a way that it corrects the window function on the basis of the frequency-dependent amplitude of the radio-frequency electrical signal, the received signal, the evaluation signal and/or the amplitude of the radio-frequency signal in superposition with the received signal.

For determining the frequency response at the respective measuring point, the measuring unit can comprise a second signal divider which serves for branching off the radio-frequency signal, the received signal or the evaluation signal at the measuring point, a detector arranged behind the second signal divider and generating an output signal whose amplitude is proportional to the power at the respective measuring point (diodes have this characteristic, for example), a low-pass filter downstream of the detector, and a second analog-to-digital converter arranged downstream of the low-pass filter.

On the basis of the resulting digital signal, the evaluation unit can accordingly determine the frequency response, that is to say the frequency dependence of the amplitude at the respective measuring point, and thus correct the windowing.

Since, by means of the method according to the invention, the distance can be determined very accurately and with no falsification, it is possible to use the distance-measuring device described above as a fill-level measuring device which serves for measuring the fill level of a filling material located in a container.

Within the scope of the distance-measuring device according to the invention, the term "unit" shall, in principle, be understood to mean any electronic circuit that is suitably designed for its intended purpose. Depending on the requirement, it can therefore be an analog circuit for generating or processing corresponding analog signals. However, it can also be a (semiconductor-based) digital circuit, such as an FPGA or a storage medium in interaction with a program. In this case, the program is designed to carry out the corresponding method steps or to apply the necessary calculation operations of the respective unit. In this context, various electronic units of the fill level measurement device in the sense of the invention can potentially also access a common physical memory or be operated by means of the same physical digital circuit.

BRIEF DESCRIPTION OF THE DRAWINGS

The invention is explained in more detail with reference to the following figures. The following is shown.

DETAILED DESCRIPTION

Figure 1:
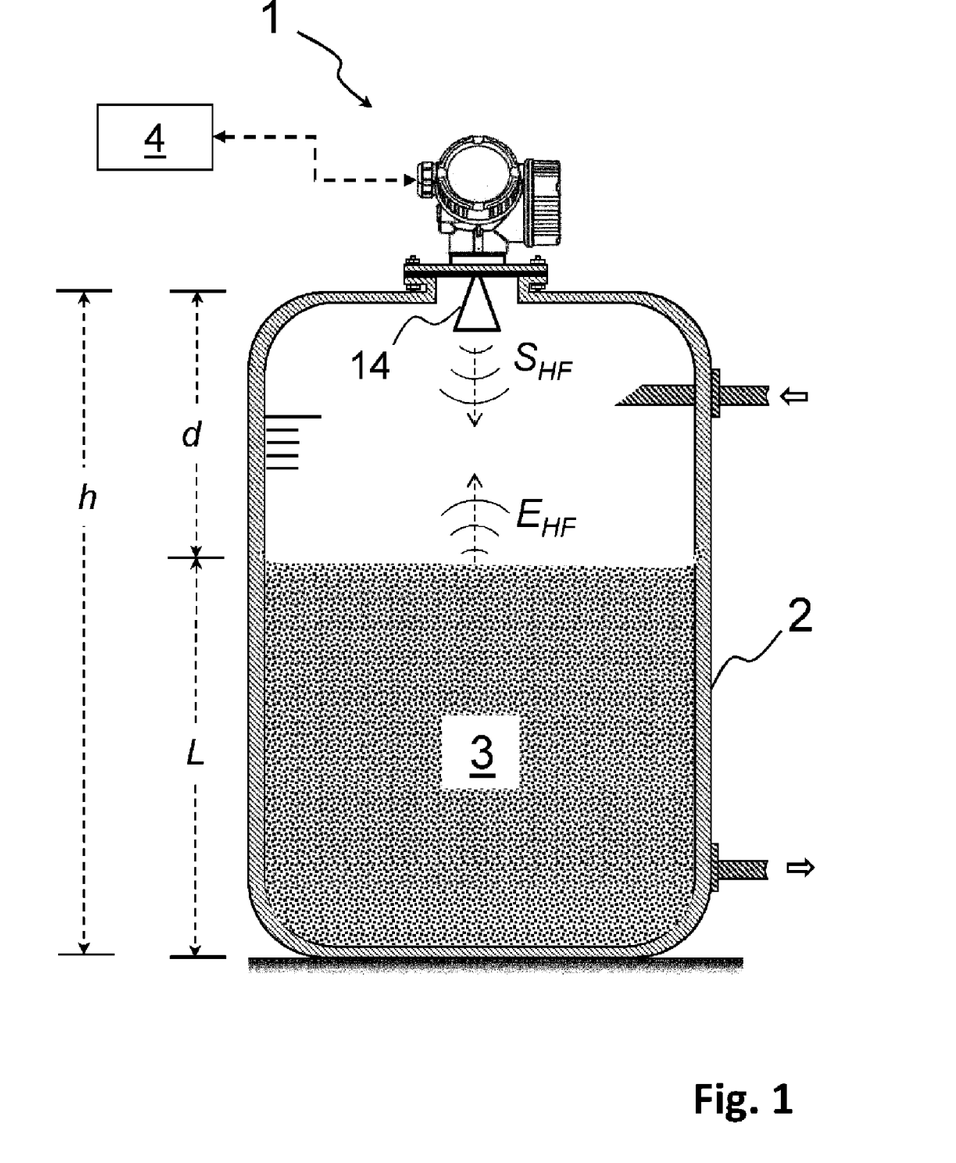
FIG. 1 shows a typical arrangement of a fill-level measuring device on a container.

For a basic understanding of the invention, FIG. 1 shows a typical arrangement of a freely radiating, radar-based fill level measurement device 1 on a container 2. In the container 2 is a filling material 3, whose fill level L is to be determined by the fill level measurement device 1. For this purpose, the fill level measurement device 1 is mounted on the container 2 above the maximum permissible fill level L. Depending on the field of application, the height h of the container 2 can be up to 125 m.

As a rule, the fill level measurement device 1 is connected via a bus system, such as "Ethernet," "PROFIBUS," "HART," or "Wireless HART," to a higher-level unit 4, such as a process control system or a decentralized database. On the one hand, information about the operating status of the fill level measurement device 1 can thus be communicated. On the other hand, information about the fill level L can also be transmitted via the bus system in order to control any inflows or outflows that may be present at the container 2.

Since the fill-level measurement device 1 shown in FIG. 1 is designed as freely radiating radar measuring device, it comprises a corresponding transmitting/receiving antenna 14. As indicated, the transmitting/receiving antenna 14 can be designed as a horn antenna, for example. Regardless of the design, the transmitting/receiving antenna 14 is oriented in such a way that a corresponding radar signal $S_{HF}$ is emitted in the direction of the filling material 3 according to the FMCW principle.

The radar signal $E_{HF}$ is reflected at the surface of the filler 3 and, after a corresponding signal time-of-flight, is correspondingly received as an electrical received signal $e_{HF}$ at the transmitting/receiving antenna 14. The signal time-of-flight of the radar signal $S_{HF}$, $E_{HF}$ depends on the distance d=h−L of the fill-level measuring device 1 from the filling material surface.

In contrast to the shown embodiment variant, and electrically conductive probe, such as a hollow conductor or coaxial cable which extends toward the base of the container, can be used in place of the transmitting/receivingantenna 14. This embodiment variant is known as TDR ("Time Domain Reflectometry").

Figure 2:
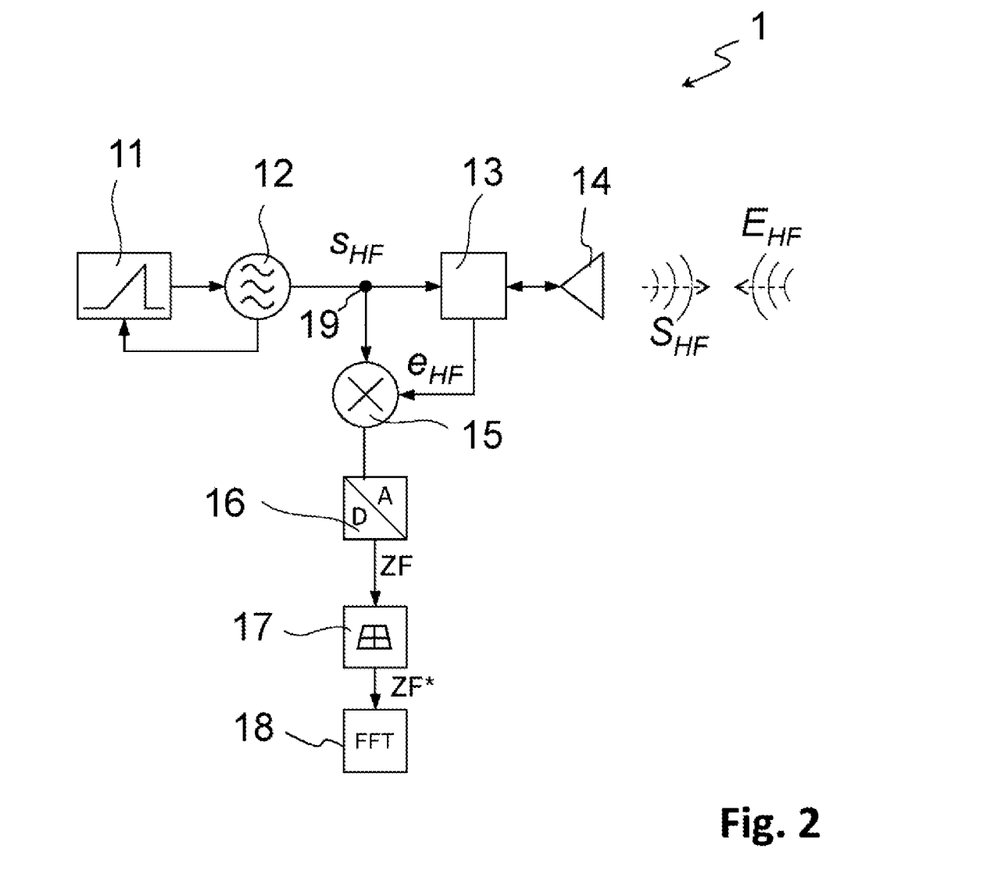
FIG. 2 shows a basic circuit configuration of an FMCW-based distance-measuring device.

The basic circuit design of a fill-level measuring device 1 operating according to the FMCW method is illustrated in FIG. 2: The core of the structure is a radio-frequency signal generation unit 11, 12 for generating a radio-frequency electric signal $s_{HF}$. The frequency of the radio-frequency signal $s_{HF}$ defines the frequency of the radar signal $S_{HF}$ lying in the microwave range. Therefore, the radio-frequency signal-generating unit 11, 12 must be designed to generate the radio-frequency electric signal $s_{HF}$ having the ramp-shaped frequency change required in FMCW.

Figure 6:
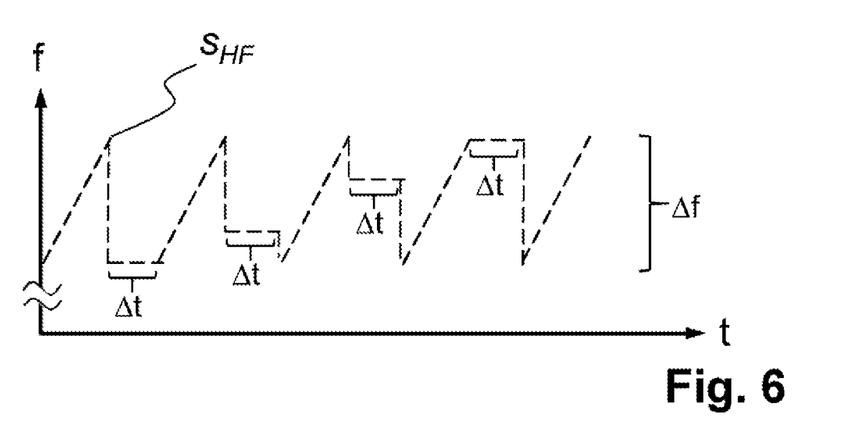
FIG. 6 shows a possible modulation of the frequency of the radio-frequency signal.

In the case of a ramp-shaped frequency change in accordance with the FMCW principle, the frequency f periodically increases repetitively within a predefined frequency band $\Delta f$ with a constant rate of change (cf. also FIG. 6). The periodicity of the individual frequency ramps may thereby be within a range of a few 100 ms. The duration of the individual ramp may be in a range between 100 µs and 100 ms. The position of the frequency band $\Delta f$ is to be set taking into account regulatory requirements, for which reason the ISM bands at 6 GHz, 26 GHz or 80 GHz are preferably implemented as frequency band $\Delta f$. The bandwidth lies in particular between 0.5 GHz and 10 GHz, depending on the position of the frequency band $\Delta f$.

In order to generate the radio-frequency signal $s_{HF}$, the radio-frequencygeneration unit 11, 12 shown in FIG. 2 comprises a radio-frequency oscillator 12 which is controlled by means of a ramp-generating unit 11. The regulation takes place in the form of a phase control (known as "phase locked loop, PLL"). Thus, the frequency f of the radio-frequency oscillator 12 is stabilized on the one hand against fluctuations in the ambient temperature. On the other hand, the ramp-shaped frequency change of the radio-frequency signal $s_{HF}$ is set.

For emitting the radio-frequency signal $s_{HF}$, the radio-frequency electrical signal $s_{HF}$ according to FIG. 2 is supplied to the antenna 14 via a first signal splitter 19 (and possibly a connected output amplifier, not shown) and a transmitting/receiving switch 13. The radio-frequency signal $s_{HF}$ is thus emitted as radar signal $S_{HF}$ in the direction of the filling material 3. In this case, the antenna 14 can be realized, for example, as a horn or planar antenna (for example as a patch antenna or a fractal antenna).

A correspondingly reflected radar signal $E_{HF}$ is received at the antenna 14 by the reflection of the radar signal $S_{HF}$ on the object, the distance d of which is to be determined (with fill-level measurement, the surface of the filling material 3).

After reflection, the radar signal $E_{HF}$ in the transmitting/receiving antenna 14 is converted back into a purely electrical received signal $e_{HF}$ (which in turn may optionally be amplified by a receiving amplifier). The received signal $e_{HF}$ is subsequently mixed by means of a mixer 15 with the radio-frequency signal $s_{HF}$ of the radio-frequency signal-generation unit 11, 12, wherein the radio-frequency signal $s_{HF}$ is branched off from the first signal divider 19 for this purpose. In this way, an evaluation signal ZF typical of the FMCW method is generated, which forms the basis for determining the distance d. According to the FMCW principle, the frequency of the evaluation signal ZF is thereby proportional to the distanced of the object, such that a suitable evaluation unit 18 may determine the distance d via a measurement of the frequency f of the evaluation signal ZF. To determine the frequency of the evaluation signal ZF, this may be subjected to a (Fast) Fourier transform, for example, FFT for short.

Figure 3:
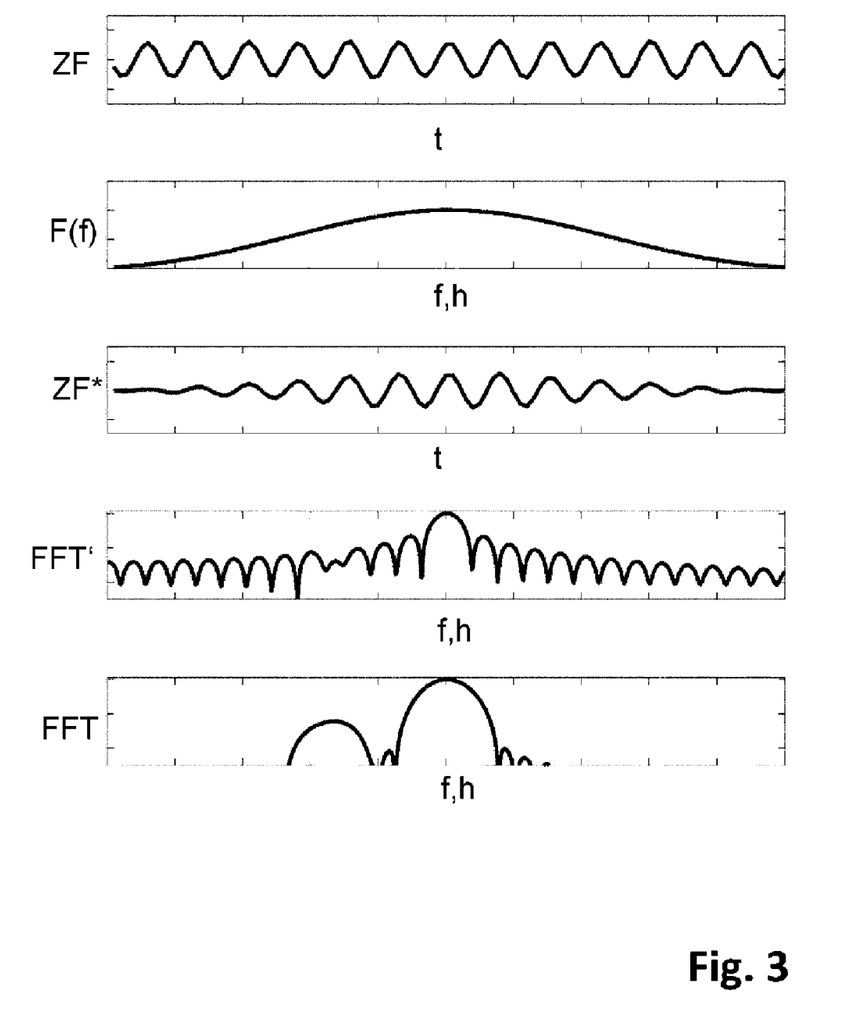
FIG. 3 shows diagrams for clarification of the signal processing in the distance-measuring device.

The time curve of the evaluation signal ZF is shown in FIG. 3. In the ideal case, therefore, when radar signal $S_{HF}$ is reflected on the planar surface of the filling material 3, the evaluation signal ZF has only a discrete frequency f. After the Fourier transform by the evaluation unit 18, this frequency f in the evaluation curve FFT, FFT' corresponds to the (single) maximum which corresponds to the distance d to the filling material surface. The resulting evaluation curve FFT, FFT' reflects the amplitude A as a function of the frequency f or as a function of the distance d. The evaluation unit 18 determines the fill level L from the evaluation curve FFT, FFT' accordingly by detecting and locally assigning this global maximum which is caused by the filling material surface.

As can be seen from FIG. 3, however, in addition to this maximum in the evaluation signal ZF there are still further frequency components in practice. In addition, the Fourier transform causes parasitic secondary maxima. A separation of such secondary maxima can be suppressed by a so-called windowing of the evaluation signal ZF. The frequency spectrum of the evaluation signal ZF* is weighted, i.e. multiplied, with a corresponding window function F(f). The window function F(f) shown in FIG. 3 is a Taylor function. In order to achieve this function, the middle frequencies f are weighted more heavily than the frequencies at the edge regions of the measuring range h. However, depending on the general reflection ratios, any other function, such as a Hamming function or a Chebyshev function, can also be implemented as a window function F(f) in the weighting unit 17. The comparison between the evaluation curve FFT' without windowing and the evaluation curve FFT after the windowing of the evaluation signal ZF* makes it clear from FIG. 3 that a large part of the secondary maxima can thereby be masked out, so that these can no longer be incorrectly used for determining the fill level L. In the circuit shown in FIG. 2, a weighting unit 17 is correspondingly connected upstream of the evaluation unit 18. Since the weighting takes place on a digital basis, an analog/digital converter 16 is in turn connected upstream of the weighting unit 17.

In addition to the strict linearity of the frequency ramp, the error-free determination of the distance d or of the fill level L based on the evaluation signal ZF* also presupposes that the further components 13, 14, 15, 16 of the fill-level measuring device 1 have no parasitic frequency dependence. However, this can occur above all with progressive operation of the fill-level measuring device 1. As a result, this in turn makes it possible to produce secondary maxima which cannot be masked out by means of the windowing described above.

Figure 4:
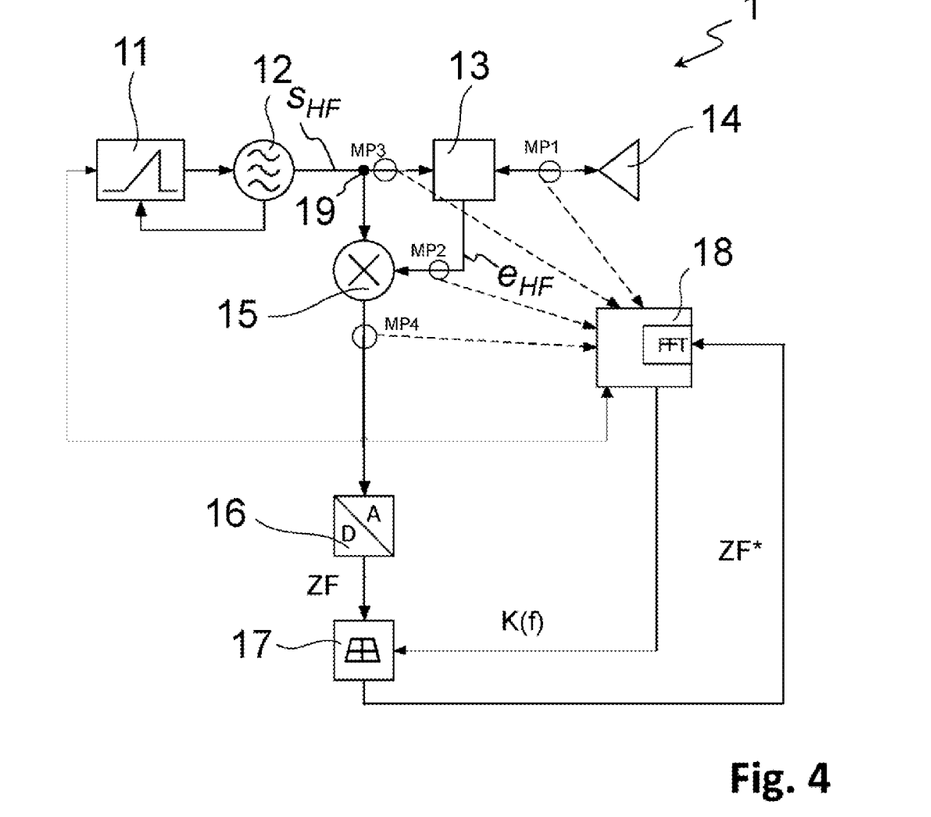
FIG. 4 shows a circuit configuration of the distance-measuring device according to the present disclosure.

In order to overcome this, the idea according to the invention is to determine the amplitude response $A_{MP1,2,3,4}(f)$ of the radio-frequency signal $s_{HF}$, the reception signal $e_{HF}$ and/or the evaluation signal ZF and to take this into account by means of a corresponding correction function K(f) in the window function F(f). In this case, the term "amplitude response" in the context of the invention is defined as a function of the amplitude $A_{MP1,2,3,4}(f)$ of the respective signal $s_{HF}$, $e_{HF}$, ZF as a function of the frequency f. To implement this idea, the circuit shown in FIG. 2 can be expanded in the way illustrated in FIG. 4:

Individual measuring points MP1,2,3,4 can be defined at different points of the circuit in order to determine the amplitude response $A_{MP1,2,3,4}(f)$ of the signals $s_{HF}$, $e_{HF}$, ZF. The determination of the amplitude response $A_{MP3}(f)$ of the radio-frequency signal $s_{HF}$ is possible at a measuring point MP3 between the radio-frequency oscillator 12 and the transmitting/receiving switch 13. The amplitude response $A_{MP2}(f)$ of the received signal $e_{HF}$ can in turn be determined at a measuring point MP2 between the transmitting/receiving switch 13 and the mixer 15. The amplitude response $A_{MP4}(f)$ of the evaluation signal ZF can be detected at a corresponding measuring point MP4 between the mixer 15 and the weighting unit 17. Since both the radio-frequency signal $s_{HF}$ and the incoming received signal $e_{HF}$ are guided between the transmitting/receiving switch 13 and the transmitting/receiving antenna 14, the amplitude response $A_{MP1}(f)$ of the received signal ($e_{HF}$) superimposed by the radio-frequency signal ($s_{HF}$) can also be tapped off at this measuring point MP1.

Figure 5:
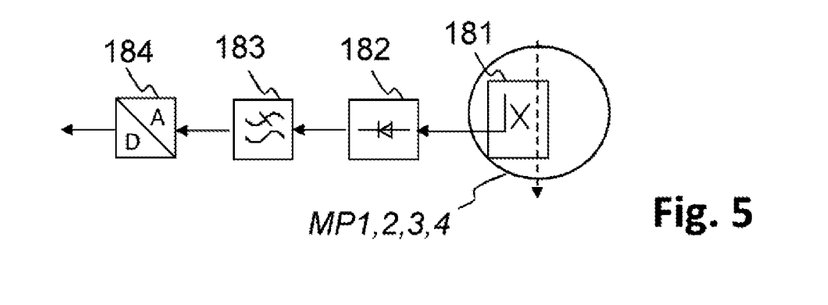
FIG. 5 shows a measuring unit for determining the frequency-dependent amplitude.

At the individual measuring points MP1, 2, 3, 4 the respective amplitude response $A_{MP1,2,3,4}(f)$ can be recorded by means of a measuring unit shown in FIG. 5. For this purpose, a second signal divider 181 is arranged in the signal path at the respective measuring point MP1, 2, 3, 4 from which the respective analog signal $s_{HF}$, $e_{HF}$, ZF is branched off into a detector 182. The detector 182 provides an electrical signal whose amplitude is proportional to the power at the respective measuring point MP1, 2, 3, 4. Accordingly, a diode, for example, can be used as detector 182. Thus, a voltage proportional to the power or amplitude $A_{MP1,2,3,4}(f)$ is generated. The amplitude $A_{MP1,2,3,4}(f)$ is thus present in digital form by analog/digital conversion of this voltage by means of a second analog/digital converter 184.

In the embodiment shown in FIG. 4, the respective digitized amplitude $A_{MP1,2,3,4}(f)$ is recorded by the evaluation unit 18. It goes without saying that the respective signal $s_{HF}$, $e_{HF}$, ZF can also be supplied to the evaluation unit 18 in analog form, provided that the evaluation unit 18 comprises corresponding inputs for ascertaining the analog value.

In order that the amplitude response $A_{MP1,2,3,4}(f)$ can be recorded by the evaluation unit 18 over the complete frequency band, the evaluation unit 18 must control the ramp generation unit 11 or the frequency of the radio-frequency signal $s_{HF}$ accordingly.

In order to determine the amplitude response $A_{MP1,2,3,4}(f)$, it is appropriate for the respective amplitude $A_{MP1,2,3,4}$ to be recorded within the FMCW frequency band $\Delta f$ at several discrete frequency interpolation points, so that the amplitude response $A_{MP1,2,3,4}(f)$ can be obtained as a rising function by means of suitable regression from the individual amplitude values $A_{MP1,2,3,4}$ at the respective frequency interpolation point. For finding a suitable regression type (e.g. linear, quadratic or polynomial), the evaluation unit 18 can use, for example, the least squares method (known in the art as "least square fit").

A possible activation of the ramp generation unit 11 by the evaluation unit 11 in which the frequency response of the radio-frequency signal $s_{HF}$ has four discrete frequency interpolation points, is illustrated in FIG. 6: The four frequency interpolation points are implemented in this representation in each case after the end of a frequency ramp required for the FMCW method. In this case, the frequency interpolation points are equally distributed with respect to their respective frequency f rising above the frequency band Δf. The interval length Δf of the individual frequency reference points is to be dimensioned at least as long as the evaluation unit 18 requires for determining the respective amplitude $A_{MP1,2,3,4}$ with the desired resolution or bit length. In this type of generation of the amplitude response $A_{MP1,2,3,4}(f)$, the evaluation unit 18 should be designed such that it records the respective amplitude $A_{MP1,2,3,4}$ during the time interval Δt of the corresponding frequency reference point.

It goes without saying that the design of the frequency response of the radio-frequency signal s HF shown in FIG. 6 is for illustrative purposes only. In order to achieve a more precise mapping of the individual amplitude response $A_{MP1,2,3,4}(f)$, the number of frequency interpolation points can of course be arbitrarily increased. It is also not fixed in accordance with the invention to implement a frequency interpolation point after each individual frequency ramp. For example, a single frequency interpolation point can also be implemented only after every tenth frequency ramp.

The evaluation unit 18 can generate the correction function K(f) on the basis of the detected amplitude transitions $A_{MP1,2,3,4}(f)$. In this case, the secondary maxima which are caused by any parasitic frequency dependence of the electrical components 13, 14, 15 are optimally suppressed when the correction function K(f) sets the amplitude response $A_{MP2,4}(f)$ in the reception path (i.e., $e_{HF}$ or ZF) in relation to the overall generated frequency-dependent transmission power.

The correction function K(f) is then obtained on the basis of or $$K(f) = \left(1 - \frac{A_{MP4}(f)}{A_{MP1}(f)}\right)^{-1}$$

or is corrected on the basis of $$K(f) = \left(1 - \frac{A_{MP4}(f)}{A_{MP3}(f)}\right)^{-1}$$

Instead of normalizing to the pure transmit signal $s_{HF}$, the normalization can also be effected to the transmit signal $s_{HF}$ superimposed by the receive signal $e_{HF}$ at the measuring point MP1 between the transmitting/receiving switch 13 and the transmitting/receiving antenna 14. In this case, the correction function K(f) yields:

$$K(f) = \left(1 - \frac{A_{MP4}(f)}{A_{MP1}(f)}\right)^{-1}$$

or $$K(f) = \left(1 - \frac{A_{MP2}(f)}{A_{MP1}(f)}\right)^{-1}$$

The correction function K(f) obtained on the basis of one of these formulas is transmitted to the weighting unit 17 by the evaluation unit 18 according to the invention. The weighting unit 17 can in turn adjust the window function F(f) by multiplying with the correction function K(f). Thus, in addition to the windowing, aging-related deviations, mismatches, parasitic frequency responses of the components 11, 12, 13, 15 or also deposits on the transmitting/receiving antenna 14 in the evaluation signal ZF* are compensated because the correction function K(f) adapts to the aging via the changing amplitude ratio. This correspondingly increases the accuracy and the security of the distance measurement or fill-level measurement, in particular with increasing operating time of the measuring device.

The invention claimed is:

1. A method for frequency modulated continuous wave (FMCW) radar-based measurement of a distance to an object, the method comprising:
   generating a radio-frequency electrical signal frequency-modulated according to the FMCW principle;
   emitting the radio-frequency signal as radar signal in the direction of the object;
   receiving a reflected radar signal as an electrical received signal after reflection on the object;
   generating an evaluation signal by mixing the received signal with the radio-frequency signal;
   weighting frequencies of the evaluation signal by means of a defined window function;
   determining the distance from the weighted evaluation signal;
   determining a frequency dependence of an amplitude of the radio-frequency signal, of an amplitude of the received signal, of an amplitude of the evaluation signal, and of an amplitude of the radio-frequency signal in superposition with the received signal; and
   correcting the window function on the basis of the frequency-dependent amplitude of the radio-frequency electrical signal, the received signal, the evaluation signal and/or the amplitude of the radio-frequency signal in superposition with the received signal,
   wherein the window function is corrected by means of one of the following correction functions:

$$K(f) = \left(1 - \frac{A_{MP2}(f)}{A_{MP1}(f)}\right)^{-1}$$

$$K(f) = \left(1 - \frac{A_{MP2}(f)}{A_{MP3}(f)}\right)^{-1}$$

$$K(f) = \left(1 - \frac{A_{MP4}(f)}{A_{MP1}(f)}\right)^{-1}$$

and $$K(f) = \left(1 - \frac{A_{MP4}(f)}{A_{MP3}(f)}\right)^{-1}$$

2. The method according to claim 1, wherein the frequency dependence of the amplitude of the received signal, of the radio-frequency signal, of the evaluation signal, and/or of the radio-frequency signal is/are measured in superposition with the received signal by generating the radio-frequency electrical signal with a constant frequency for one predefined timespan in stages within the FMCW frequency band.

3. The method according to claim 1,
wherein the distance is determined by means of a Fast Fourier transform of the weighted evaluation signal.

4. The method according to claim 1,
wherein a Hamming function, a Taylor function, or a Chebyshev function is used as the window function.

5. A frequency modulated continuous wave (FMCW) radar-based distance-measuring device for measuring a distance to an object, comprising:
a radio-frequency generation unit designed to generate a radio-frequency electrical signal frequency-modulated on the basis of the FMCW principle;
a transmitting/receiving antenna which serves for emitting the radio-frequency signal as a radar signal and which serves for receiving a radar signal reflected on the object as an electrical received signal;
a mixer by means of which the radio-frequency electrical signal can be mixed with the received signal such that an evaluation signal is generated;
a weighting unit designed to weight the evaluation signal with respect to its frequencies by means of a defined window function; and
an evaluation unit which is designed to determine the distance from the weighted evaluation signal, the evaluation unit including:
a measuring unit configured to determine an amplitude of the radio-frequency signal, an amplitude of the received signal, an amplitude of the evaluation signal, and/or an amplitude of the radio-frequency signal in superposition with the received signal as a function of frequency,
wherein the evaluation unit is configured to correct the window function on the basis of the frequency-dependent amplitude of the radio-frequency electrical signal, of the received signal, of the evaluation signal, and/or of the amplitude of the radio-frequency signal in superposition with the received signal,
wherein the window function is corrected by means of one of the following correction functions:

$$K(f) = \left(1 - \frac{A_{MP2}(f)}{A_{MP1}(f)}\right)^{-1}$$

$$K(f) = \left(1 - \frac{A_{MP2}(f)}{A_{MP3}(f)}\right)^{-1}$$

$$K(f) = \left(1 - \frac{A_{MP4}(f)}{A_{MP1}(f)}\right)^{-1}$$

and $$K(f) = \left(1 - \frac{A_{MP4}(f)}{A_{MP3}(f)}\right)^{-1}$$

6. The distance-measuring device according to claim 5, wherein the measuring unit used to determine the frequency-dependent amplitude includes:
a signal splitter which is used for branching off the radio-frequency signal of the received signal or of the evaluation signal;
a detector arranged downstream of the signal splitter;
a low-pass filter connected downstream of the detector; and
an analog-to-digital converter arranged downstream of said low-pass filter.

7. A use of the FMCW radar-based distance-measuring device as claimed in claim 5, wherein the use includes measuring a fill level of a filling material in a container.

* * * * *